US005177501A

United States Patent [19]

Seyfried

[11] Patent Number: 5,177,501

[45] Date of Patent: Jan. 5, 1993

[54] ELECTROOPTICAL RECORDING DEVICE

[75] Inventor: Ulrich Seyfried, Hemmingen, Fed. Rep. of Germany

[73] Assignee: Alcatel N.V., Amsterdam, Netherlands

[21] Appl. No.: 604,642

[22] Filed: Oct. 29, 1990

[30] Foreign Application Priority Data

Nov. 13, 1989 [DE] Fed. Rep. of Germany ....... 3937736

[51] Int. Cl.[5] ...................... G01D 15/14; H04N 1/036

[52] U.S. Cl. ................................ 346/107 R; 358/302

[58] Field of Search .................. 346/107 R, 160, 108; 358/75, 302; 354/108; 359/40, 41, 53

[56] References Cited

U.S. PATENT DOCUMENTS

| | | | |
|---|---|---|---|
| 3,401,400 | 9/1968 | Lindsey | 346/108 |
| 4,368,963 | 1/1983 | Stolov | 359/40 |
| 4,524,372 | 6/1985 | De Cock et al. | 346/160 |
| 4,605,972 | 8/1986 | Hatanaka | 358/302 |
| 4,607,917 | 8/1986 | Ebner et al. | 350/392 |
| 4,672,258 | 6/1987 | Konishi | 346/108 |
| 4,859,034 | 8/1989 | Shiraishi et al. | 346/108 X |
| 4,896,168 | 1/1990 | Newman et al. | 346/107 R |
| 4,897,639 | 1/1990 | Kanayama | 346/107 R X |

FOREIGN PATENT DOCUMENTS

| | | |
|---|---|---|
| 0051886 | 5/1982 | European Pat. Off. . |
| 0117604 | 9/1984 | European Pat. Off. . |
| 0310287 | 4/1989 | European Pat. Off. . |
| 0231912 | 1/1986 | Fed. Rep. of Germany . |
| 3440529 | 5/1986 | Fed. Rep. of Germany . |
| 3742538.2 | 10/1988 | Fed. Rep. of Germany . |
| 57-138962 | 8/1982 | Japan . |
| 57-211871 | 12/1982 | Japan . |
| 58-14811 | 1/1983 | Japan . |
| 63-54264 | 3/1988 | Japan . |

OTHER PUBLICATIONS

Ueno et al., "PLZT spatial light modulator for a 1-D hologram memory", *Applied Optics*, vol. 19, No. 1, Jan. 1, 1980, pp. 164-172.

"Ein neus Licht geht auf", Kommunikationstechnik von SEL, SEL-Optodruckkopt, SEL ALCATEL Gruppe (4 pages).

*Primary Examiner*—Benjamin R. Fuller
*Assistant Examiner*—David Yockey
*Attorney, Agent, or Firm*—Spencer, Frank & Schneider

[57] ABSTRACT

An electro-optical recording device for use in dot matrix color recording which uses three identically configured arrays of light gates is described. The three identically configured light gate arrays are arranged relative to one another at such an angle that their optical axes intersect in the recording plane.

9 Claims, 2 Drawing Sheets

ELECTROOPTICAL RECORDING DEVICE

CROSS REFERENCE TO RELATED APPLICATION

This application claims the priority of application Ser. No. P 39 37 736.9, filed Nov. 13, 1989, in the Federal Republic of Germany, the subject matter of which is incorporated herein by reference.

BACKGROUND OF THE INVENTION

1. Field of the Invention

This invention relates to an electro-optical recording device including a plurality of light gates arranged in a row.

2. Background Information

Such a recording device is disclosed in DE-OS 3,742,538. In this device, a color sensitive medium, for example an appropriate record carrier, is illuminated through an array of light gates in a timed succession and in a dot matrix pattern with the three basic colors, red, green and blue corresponding to the original to be reproduced. The color change is effected by a continuously rotating disc which is divided into color sectors and is disposed in the beam path of the light source illuminating the light gate array.

In dot matrix recording devices or printers it is customary to continuously advance the record carrier during the recording process. In the prior art recording device this results in the three illumination regions associated with the individual pixels being staggered in the direction of advance, that is, the color pixels overlap only in part. The thus resulting color impression differs from that of the original. Moreover, the pixel spacing in the direction of record carrier advance is greater than in the line direction so that the reproduction is—albeit slightly—distorted.

SUMMARY OF THE INVENTION

It is an object of the invention to provide an electrooptical recording device which permits the realization of great color fidelity and a distortion free reproduction.

This is accomplished by providing three identically configured light gate arrays arranged so that their optical axes intersect at the recording plane.

The advantages realized by the invention are, in particular, that the illumination regions of the associated color pixels overlap almost one hundred percent; that the matrix line spacing is almost identical to the pixel spacing in the line direction and that a significantly shorter time is required for the recording than in the past.

BRIEF DESCRIPTION OF THE DRAWINGS

The invention will now be described in greater detail with reference to an embodiment thereof that is illustrated in the drawing figures.

DETAILED DESCRIPTION OF THE PREFERRED EMBODIMENT

Figure 1:
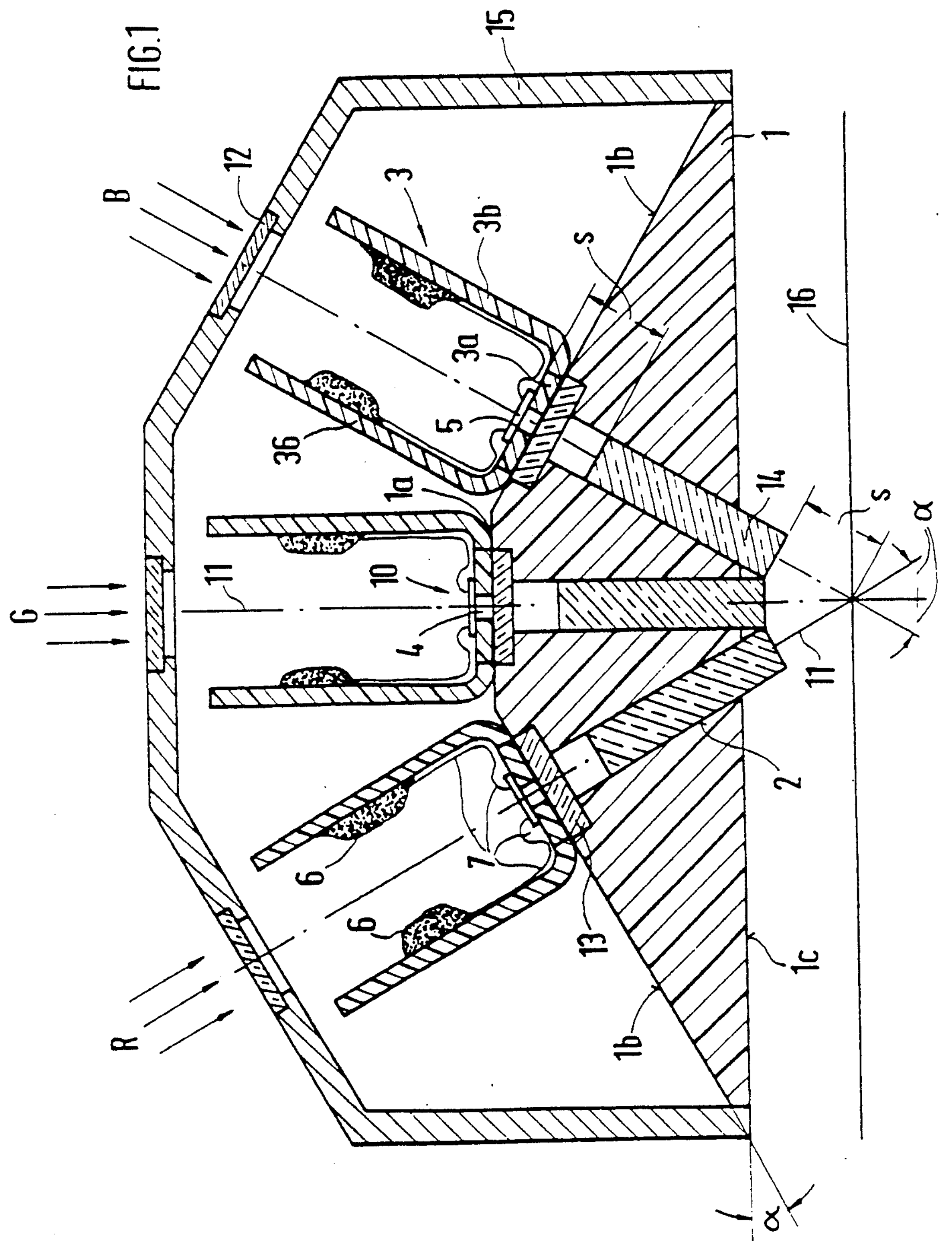
FIG. 1 is an enlarged and schematic cross-sectional view of an electro-optical recording device according to the invention.

FIG. 1 is an enlarged and schematic cross-sectional view of an electrooptical recording device. In the direction of view, the recording device extends across the width of a record carrier to be imprinted, transversely to its direction of advance.

The recording device includes a base 1 having a trapezoidal cross-sectional area. The sloped side faces 1*b* of base 1 extend at an angle $\alpha$ of 30° to bottom face 1*c*, while top face 1*a* is parallel to bottom face 1*c*. As shown in the drawing, base 1 has three longitudinal slots 2 which have a length corresponding to the length of the line to be printed. They are arranged at right angles to faces 1*a* and 1*b*, respectively, of the respective trapezoid in such a manner that their center lines 11 intersect in the recording plane 16. The recording plane 16 is the plane tangent to the surface of a record carrier to be imprinted. Such a surface may be planar or curved.

Known light gate arrays 10, such as those described in DE-OS 3,742,538 are disposed on trapezoidal faces 1*a* and 1*b* and are oriented toward longitudinal slots 2.

The support for light gate arrays 10 is provided by inflexible, elongated circuit board sections 3*a* which are part of circuit boards 3. In its center, each section 3A is provided with a slot 4 of the length of a printed line. Oriented toward slot 4, a lead lanthanum zirconate titanate (PLZT) ceramic 5 of the length of the printed line is disposed on circuit board sections 3*a*. Electrically controllable light gates 9 (FIG. 2) are formed by laminated-on electrical conductors, for example conductor paths 7. The inflexible circuit board sections 3*a* are followed at both of their long sides by flexible circuit board sections 3*b* which are well known. Parts of the actuating circuit, e.g. driver stages 6, are disposed on these circuit board sections and are connected by way of flexible conductor paths 7. In the present embodiment, the flexible partial faces 3*b* of circuit boards 3 are bent upwardly by 90°. A smaller angle is possible. The angle of bend must merely be large enough so that partial faces 3*b* will not interfere with one another in the compact arrangement of the three light gate arrays 10 as shown in FIG. 1.

In order to produce a sharp image of the light gate faces in the recording plane 16 at a ratio of 1:1, gradient index lenses 14 composed of a plurality of short pieces of gradient index fibers are disposed in the longitudinal slots 2 of base 1. They are each spaced at an objective distances from the underside of the PLZT ceramic 5 and from imaging plane 16. Below each of the circuit board sections 3*a* which sup-ports PLZT ceramic 5, there is disposed an analyzer 13.

Base 1 and the components disposed on it are covered in a light-tight manner by a hood 15. Line-length polarizers 12 are inserted into hood 15. These polarizers are oriented toward optical axes that coincide with the center lines 11 of longitudinal slots 2 in base 1 on which are disposed light gate arrays 10. Each polarizer 12, and thus each one light gate arrays 10, has a different color light source R, G, B (red, green, blue) associated with it. If mutually corresponding light gates 9 (FIG. 2) of the three light gate arrays 10 are enabled at the same time, the associated light gate windows are projected onto imaging plane 16 in congruent superposition. Since the light gate arrays 10 are arranged at an angle to the perpendicular, there appears some distortion in the reproduction which, however, can be corrected by a correspondingly changed dimension of the light gate windows. In this way, it is ensured that the individual pixel has a uniform hue over its entire surface area.

Figure 2:
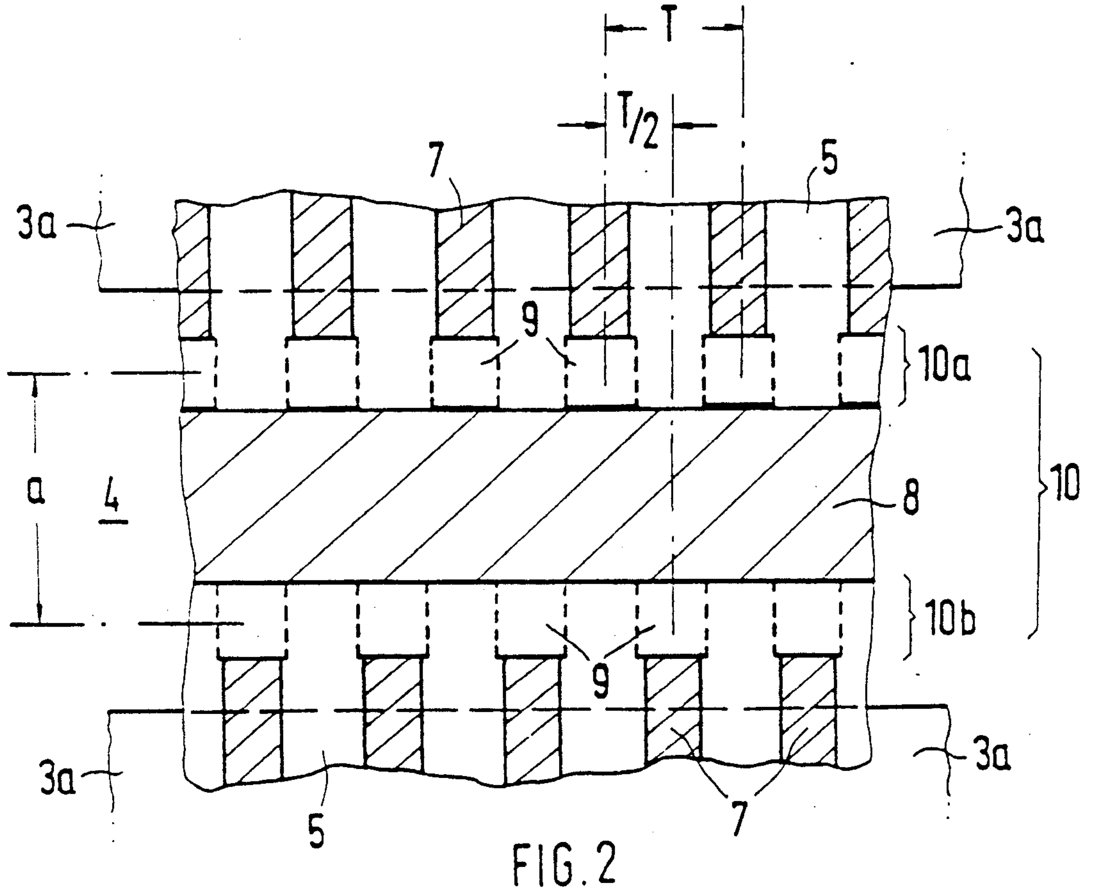
FIG. 2 is an enlarged sectional view seen from the top of the light gate array employed in the recording device according to FIG. 1.

FIG. 2 is an enlarged sectional view, seen from the top, of a light gate array 10 employed in the above-described recording device. This light gate array 10 corresponds to the device disclosed in DE-OS 3,742,538. In the drawing, the inflexible circuit board sections 3*a* and slot 4 are indicated, the slot 4 being bridged by PLZT ceramic 5. Between the laminated-on conductor paths 7 and a center electrode 8, free spaces are left to form light gates 9. Center electrode 8 divides the light gates into two rows of light gates 10*a* and 10*b*. The light gates 9 of one row are spaced from one another at a distance T which approximately corresponds to twice the width of one light gate 9. The light gates 9 of both rows 10*a* and 10*b* are offset relative to one another by one-half the distance, T/2, that is the one row is placed opposite the gaps of the other row. Between the two light gate arrays 10*a* and 10*b* there is a distance a. The recording of a matrix row thus occurs in two successive sections whose succession in time corresponds to the advance by the distance a of the record carrier to be imprinted, that is each matrix row is composed of two half-lines which complement one another.

The PLZT ceramic 5 employed exemplarily as a base for the light gate arrays 10 is particularly suitable for color reproductions since it is color neutral. The use of other doubly refracting light gate switches, for example those based on liquid crystals or magnetooptics, is possible.

It will be understood that the above description of the present invention is susceptible to various modifications, changes and adaptations, and the same are intended to be comprehended within the meaning and range of equivalents of the appended claims.

What is claimed is:

1. An electro-optical recording device, for use in dot matrix color recording on a color sensitive medium, comprising:

three identically configured light gate arrays disposed at an angle to one another such that optical axes of said light gate arrays intersect in a recording plane of a record carrier, each of said arrays having a plurality of light gates arranged in rows transversely to a direction of advance of said record carrier and activatable by an associated actuating circuitry;

wherein for each of said light gate arrays a gradient index lens and an analyzer are provided, the gradient index lens being disposed between an associated light gate array and the recording plane and oriented along the optical axis of the associated light gate array, the analyzer being disposed between the associated light gate array and the gradient index lens; and wherein said three light gate arrays are enclosed in a light tight housing, and for each of said light gate arrays a polarizer is provided disposed in a cover of said housing in the optical axis of each of the light gate arrays.

2. A recording device according to claim 1, wherein part of said associated actuating circuitry together with an associated light gate array is disposed on a circuit board having circuit board sections, and wherein each of said circuit board sections carrying said associated actuating circuitry is bent toward the optical axis of the associated light gate array.

3. A recording device according to claim 1, wherein light gates of each of said light gate arrays are formed on a PLZT ceramic.

4. A recording device according to claim 1, wherein each light gate array is composed of two opposite rows of light gates, the rows of light gates being separated by a center electrode, and each of said rows has a light gate which is laterally offset relative to a light gate in an opposite row by one-half a distance between individual light gates in a row.

5. In awn electro-optical recording device, for use in dot matrix color recording on a color sensitive medium, an arrangement comprising:

a light tight housing having a cover;

a plurality of light gate arrays disposed inside said housing, each of said light gate arrays having a respective optical axis; and a plurality of polarizers disposed in said cover of said housing, each of said polarizers being associated with one of said plurality of light gate arrays, an associated polarizer being disposed in the optical axis of an associate light gate array.

6. The arrangement of claim 5, wherein light gates of each of said light gate arrays are formed on a PLZT ceramic.

7. The arrangement according to claim 5, wherein each of said light gate arrays is activatable by an associated actuating circuitry; part of said associated actuating circuitry together with an associated light gate array is disposed on a circuit board having circuit board sections; and each of said circuit board sections carrying said associated actuating circuitry is bent toward the optical axis of the associated light gate array.

8. The arrangement according to claim 5, wherein each light gate array is composed of two opposite rows of light gates, the rows of light gates being separated by a center electrode, and each of said rows has a light gate which is laterally offset relative to a light gate in an opposite row by one-half a distance between individual light gates in a row.

9. An arrangement according to claim 5, wherein for each of said light gate arrays a gradient index lens is oriented along the optical axis of each of the light gate arrays and disposed between each of the light gate arrays and a recording plane of a record carrier.

* * * * *